(12) United States Patent
Lisi et al.

(10) Patent No.: US 9,088,307 B2
(45) Date of Patent: Jul. 21, 2015

(54) NON-RESONANT AND QUASI-RESONANT SYSTEM FOR WIRELESS POWER TRANSMISSION TO MULTIPLE RECEIVERS

(75) Inventors: Gianpaolo Lisi, San Jose, CA (US);
Gerard G. Socci, Palo Alto, CA (US);
Ali Djabbari, Saratoga, CA (US);
Kosha Mahmodieh, Hayward, CA (US)

(73) Assignee: NATIONAL SEMICONDUCTOR CORPORATION, Santa Clara, CA (US)

( * ) Notice: Subject to any disclaimer, the term of this patent is extended or adjusted under 35 U.S.C. 154(b) by 815 days.

(21) Appl. No.: 13/329,924

(22) Filed: Dec. 19, 2011

(65) Prior Publication Data

US 2012/0169136 A1 Jul. 5, 2012

Related U.S. Application Data

(60) Provisional application No. 61/428,135, filed on Dec. 29, 2010.

(51) Int. Cl.
*H01F 27/42* (2006.01)
*H04B 5/00* (2006.01)
(Continued)

(52) U.S. Cl.
CPC ............. *H04B 5/0037* (2013.01); *H02J 5/005* (2013.01); *H02J 7/025* (2013.01); *H04B 5/0081* (2013.01)

(58) Field of Classification Search
USPC ........................................................ 307/104
See application file for complete search history.

(56) References Cited

U.S. PATENT DOCUMENTS 7,741,734 B2 6/2010 Joannopoulos et al.
2010/0244580 A1 9/2010 Uchida et al.
(Continued)

FOREIGN PATENT DOCUMENTS

JP 2010200563 A 9/2010
WO 9834319 A1 8/1998
WO 2010116441 A1 10/2010

OTHER PUBLICATIONS

Hideaki Abe, et al., "A Noncontact Charger Using a Resonant Converter with Parallel Capacitor of the Secondary Coil" 2000 IEEE Xplore.

(Continued)

*Primary Examiner* — Jared Fureman
*Assistant Examiner* — Duc M Pham
(74) *Attorney, Agent, or Firm* — Andrew Viger; Frank D. Cimino

(57) ABSTRACT

A wireless power transfer system includes: a non-resonant transmitter, or a transmitter with a resonant circuit; and a non-resonant receiver, or a receiver with a resonant circuit. In some implementations, a transmitter with a resonant circuit is operated away from its resonance frequency. In some implementations, a receiver with a resonant circuit is operated away from the transmitter resonance frequency and/or the transmitter operating frequency. In some implementations, the selection of receiver resonance frequency is based on receiver power requirements. Thus, wireless power transfer may be accomplished by operating away from resonance in a quasi-resonant or non-resonant mode, and further may be accomplished using a non-resonant transmitter and/or a non-resonant receiver. Effective power transfer may also be achieved between a transmitter and multiple receivers. A combination of resonant and non-resonant transmitter and receiver(s) may be used for power transfer.

15 Claims, 4 Drawing Sheets

(51) Int. Cl.
*H02J 5/00* (2006.01)
*H02J 7/02* (2006.01)

(56) References Cited

U.S. PATENT DOCUMENTS

2011/0181118 A1* 7/2011 Chen et al. .................... 307/104
2011/0254377 A1* 10/2011 Wildmer et al. .............. 307/104
2012/0001485 A1* 1/2012 Uchida .......................... 307/11

OTHER PUBLICATIONS

Chwei-Sen Wang, et al., "Power Transfer Capability and Bifurcation Phenomena of Loosely Coupled Inductive Power Transfer Systems", 2004 IEEE Xplore.
R. Laouamer, et al., "A Multi-Resonant Converter for Non-Contact Charging with Electromagnetic Coupling," Jul. 22, 2010, IEEE Xplore.
Andre Kurs, et al., "Wireless Power Transfer via Strongly Coupled Magnetic Resonances," Science Express, Jun. 2007.
Yuequan Hu, et al.; "Universal-Input Single-Stage PFC Flyback with Variable Boost Inductance for High-Brightness LED Applications," IEEE (2010).
G. Vandevoorde, et al.; "Wireless energy transfer for stand-alone systems: a comparison between low and high power applicability," Published by Elsevier Science B.V. (2001).
Xiao Zhi Jian, et al.; "A Novel Wirless Charging System for Movable Telephone with Printed-circuit-board WIndings of Different Structure and Shape Respectively," International Conference on Electrical Machines and Systems 2007, Oct. 8-11, Seoul, Korea.
Jun Pan, et al.; "A Self-Powered Sensor Module Using Vibration-Based Energy Generation for Ubiquitous Systems," IEEE (2005).
Geffrey K. Ottman, et al.; "Adaptive Piezoelectric Energy Harvesting Circuit for Wireless Remote Power Supply," IEEE (2002).
C.-C., Tsai, B., et al.; "Design Wireless Transcutaneous Energy Transmission System for Totally Artificial Hearts," IEEE (2000).
David L. Mascarenas, et al.; "Experimental studies of using wireless energy transmission for powering embedded sensor nodes," Journal of Sound and Vibration, Published by Elsevier Ltd. (2009).
Jonsensor Zhao,; "A new calculation for designing multilayer planar spiral inductors," EDN (Jul. 29, 2010).
Takehiro Imura, et al, "Basic Experimental Study on Helical Antennas of Wireless Power Transfer for Electric Vehicles by using Magnetic Resonant Couplings," IEEE (2009).
Aristeidis Karalis, et al., "Efficient wireless non-radiative mid-range energy transfer," Elsevier, Science DIrect, Annals of Physics, (2007).

* cited by examiner

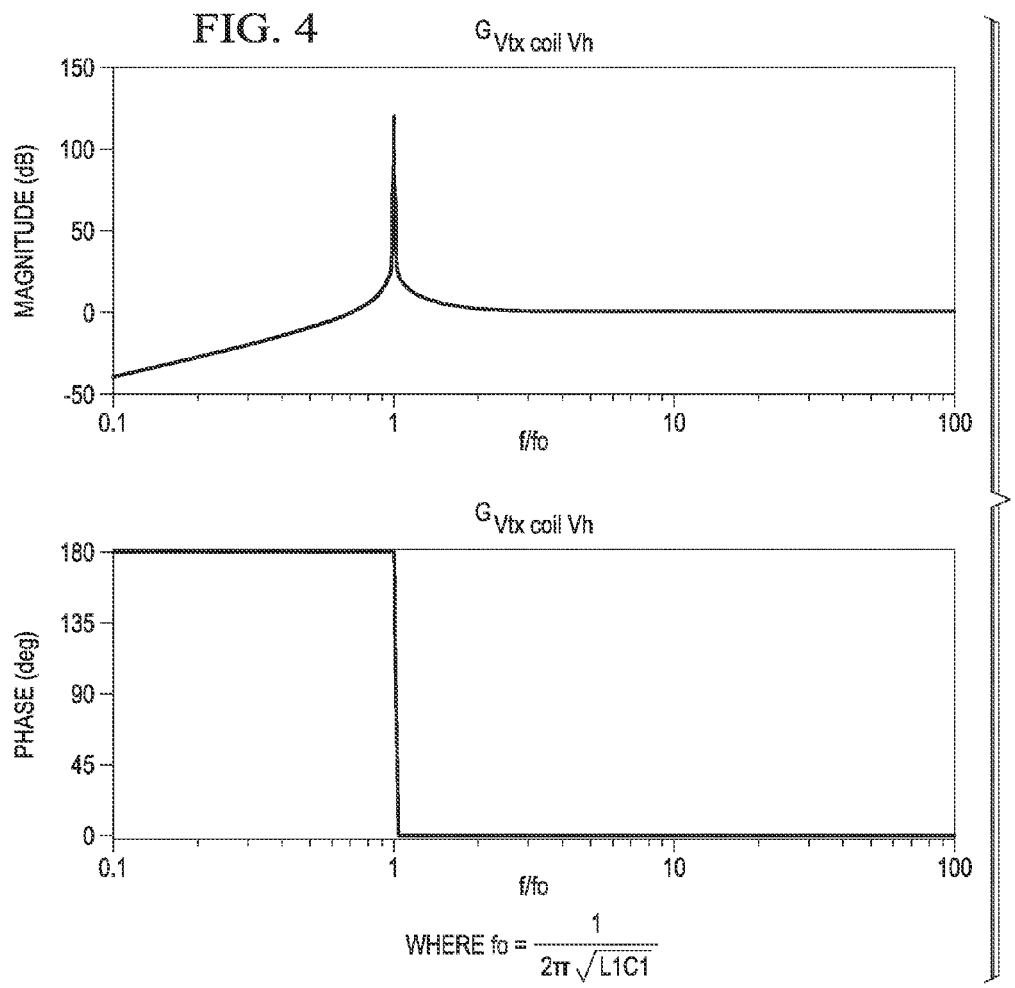
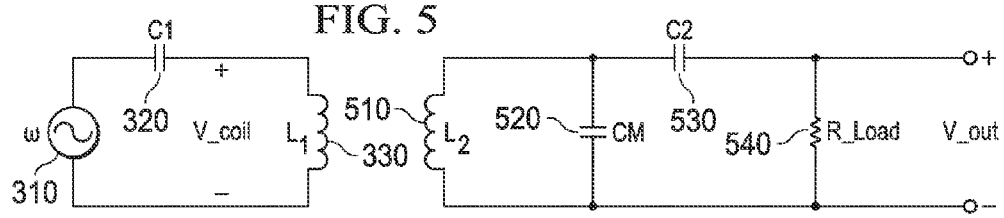

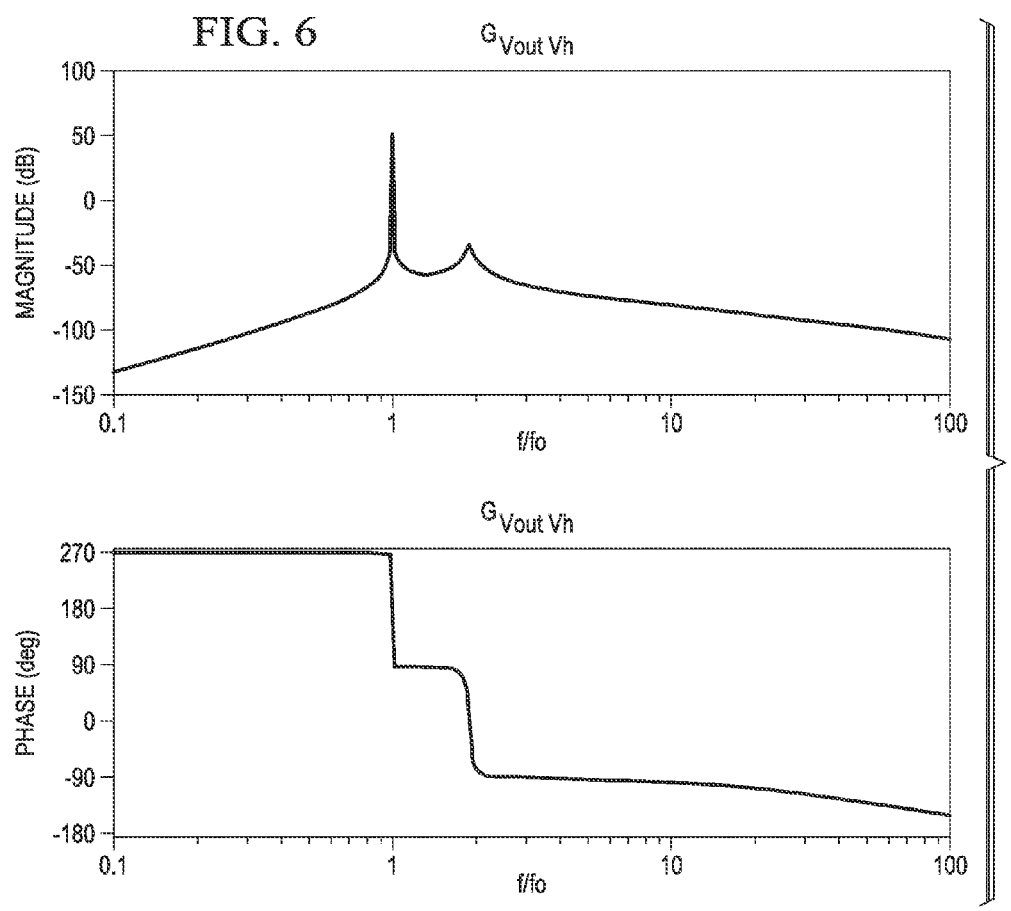

NON-RESONANT AND QUASI-RESONANT SYSTEM FOR WIRELESS POWER TRANSMISSION TO MULTIPLE RECEIVERS

CROSS REFERENCE TO RELATED APPLICATIONS

The present application claims benefit to U.S. provisional application 61/428,135 filed Dec. 29, 2010 entitled WIRELESS CHARGING OF MULTIPLE RECEIVERS OVER MULTIPLE FREQUENCIES, the contents of which is incorporated herein in its entirety.

BACKGROUND

Wireless power transfer may be achieved by coupling energy from an inductive component in a power delivery device (transmitter) to an inductive component in a power receiving device (receiver). Alternatively, capacitive components may be coupled.

A wireless power transfer system may include multiple receivers. The multiple receivers may be of different designs with different characteristics, or may be of the same design with different characteristics due, for example, to tolerances or aging. It would be desirable to have the capability to effectively transfer power to one or more of a variety of receivers with different characteristics using one transmitter.

It would further be desirable to effectively transfer power to one or more receivers over a range of frequencies without needing to tune components of the transmitter or receivers.

FIGURES

FIG. 4 illustrates the frequency response of an exemplary transmitter.

FIG. 5 illustrates an exemplary transmitter coupled to an exemplary receiver.

FIG. 6 illustrates the frequency response of an exemplary transmitter coupled to an exemplary receiver.

DETAILED DESCRIPTION

Figure 1:
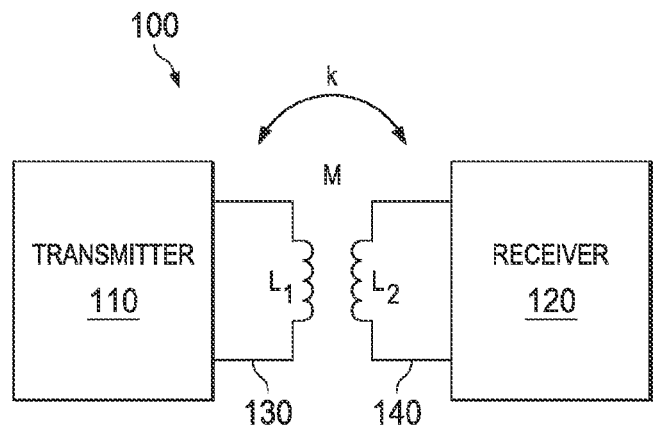
FIG. 1 illustrates an exemplary wireless power transfer system.

For a wireless power transfer system using inductive power transfer components (i.e., power transfer coils) the power is transferred through magnetic coupling between transmitter and receiver power transfer coils. When the transmitter and receiver circuits are resonant circuits and have substantially the same resonance frequency and the transmitter operates at that resonance frequency, the system is capable of maximum power transfer. For example, transmitter resonant circuit output voltage can be significantly higher than the resonant circuit input voltage.

However, such a resonant system may not be desirable, or may be difficult to implement in a system with multiple receivers. For example, power transfer in a resonant system diminishes significantly when multiple receivers are in proximity to the transmitter. The quality factor of a resonant circuit is sensitive to loading; therefore a resonant transmitter circuit with multiple loads in proximity has a much lower quality factor, and hence reduced power transfer. A resonant system must compensate for this lower quality factor, possibly with additional circuitry or software in the transmitter or receiver(s). Further, the resonant system may require costly tuning components such as variable capacitors to maintain resonance through a variety of system conditions. Additionally, a resonant transmitter may require a low voltage direct current (DC) input (e.g., 5 V DC) to limit the output voltage on the transmitter power transfer coil and thereby limit the magnetic field intensity because the ratio of output voltage to input voltage can be very high, especially for high quality factor resonant circuits. In many cases the low DC voltage needs to be generated from a high voltage AC source such as an electric outlet or a power grid connected source. This requires an AC/DC conversion from a high voltage (e.g. 110V or 220V) alternating current (AC) to the low voltage DC, possibly requiring several stages of power conversion.

In the following discussions, a receiver may include a resonant circuit; however, the concepts apply equally to a receiver without resonant circuits. A system may include one or more receivers, and one or more of the receivers may include a resonant circuit.

A system operated in a non-resonant or quasi-resonant mode overcomes some of the issues that add complexity and cost to a resonant system. For example, a non-resonant system does not exhibit a significant loss in quality factor when multiple receivers are in proximity, so does not require additional circuitry or software to compensate for the quality factor reduction. Further, because resonance is not maintained, high-cost tuning components are not required. Additionally, because the ratio of output voltage to input voltage in a non-resonant system is small, the input voltage of the non-resonant transmitter circuit may be much higher than that of a resonant system. Therefore, the power supply of a non-resonant system does not need as many power conversion stages as is necessary for a resonant system.

FIG. 1 illustrates an exemplary wireless power transfer system 100 with a transmitter 110 and a receiver 120. Transmitter 110 includes coil 130 having inductance L1. Receiver 120 includes coil 140 having inductance L2. Coils 130 and 140 are coupled with coupling coefficient k, which is a measure of magnetic coupling between the power transfer coils. The coupling coefficient is at least in part a function of the distance between the transmitter and the receiver and the relative orientation of the transmitter to the receiver. When the coupling coefficient between power transfer coils decreases, the power transferred between the coils correspondingly decreases. A mutual inductance M is established between coupled coils 130 and 140 at least in part as a function of coupling coefficient k and inductances L1 and L2. Coil 130 may be physically implemented as one or more coils.

A receiver may be a wirelessly-rechargeable device such as a mobile phone, computer, or GPS device. A receiver may alternatively be a wirelessly-powered device.

Figure 2:
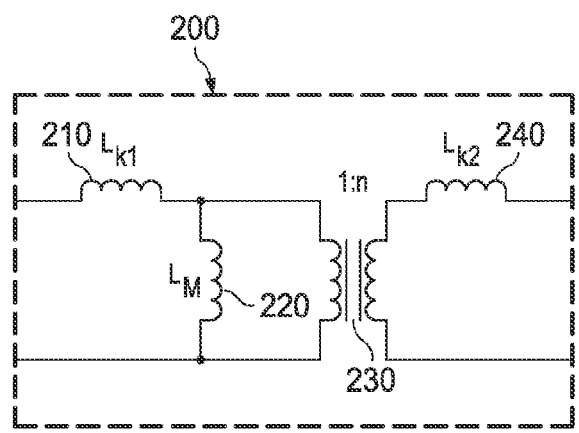
FIG. 2 illustrates an exemplary circuit model of coupled power transfer coils.

FIG. 2 illustrates an equivalent electrical model 200 for the coils in the system 100 shown in FIG. 1. Inductors 210, 220, and 240 together with ideal transformer 230 model the effect of the coupling of coils 130 and 140 in FIG. 1. Inductors 210, 220, and 240 as modeled have the inductances shown in equations 1, 2, and 3, respectively.

$$L_{k1} = (1-k) \cdot L1 \qquad (1)$$

$$L_M = k \cdot L1 \qquad (2)$$

$$L_{k2} = (1-k) \cdot L2 \qquad (3)$$

Ideal transformer 230 in the equivalent circuit of FIG. 2 is illustrated as having a 1:n turns ratio, where n is defined in equation 4.

$$n = \sqrt{\frac{L2}{L1}} \qquad (4)$$

Coupling coefficient k is defined in equation 5.

$$k = \frac{M}{\sqrt{L1 \cdot L2}} \qquad (5)$$

Figure 3:
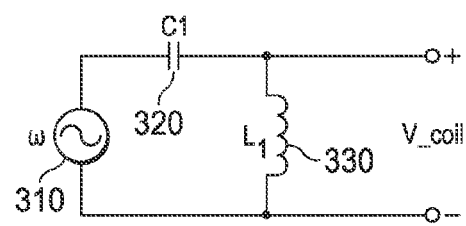
FIG. 3 illustrates an exemplary transmitter.

Although a transmitter is able to deliver maximum power when operated at resonant frequency, the transmitter may also deliver power across a wide frequency band at a reduced level. FIGS. 3 and 4 illustrate this property.

FIG. 3 illustrates an exemplary transmitter resonant circuit including an alternating current power supply 310 with variable frequency f represented by ω=2πf, a capacitor 320 with capacitance C1, and a transmitter coil 330 with inductance L1. The output voltage across coil 330 is indicated as V_coil. The resonant frequency of the circuit is given in equation 6.

$$f_0 = \frac{1}{2\pi\sqrt{L1 \cdot C1}} \qquad (6)$$

When a resonant circuit is operated at a substantially different frequency than the resonant frequency, the circuit is operating in a non-resonant mode. The output power on the power transfer coil is weakly frequency-dependent, and therefore the generated magnetic field and the corresponding power transferred is also weakly frequency-dependent.

When a resonant circuit is operated at a frequency near but not at the resonant frequency, the circuit is operating in a quasi-resonant mode. The output power on the power transfer coil will be frequency-dependent, and therefore the generated magnetic field is frequency-dependent, and the corresponding power transferred may also be frequency-dependent depending on the characteristics of the receiver.

FIG. 4 represents the uncoupled frequency response of the circuit of FIG. 3 by a plot of the transfer function of the circuit on a semi-log graph. The transfer function plotted is the coil voltage V_coil as a function of the input voltage to the resonant circuit, in this case power supply 310 voltage. The upper plot is the magnitude of the transfer function in decibels (dB) and the lower plot is the phase of the transfer function in degrees. The horizontal axis is normalized frequency, f/f0, displayed logarithmically.

As can be seen from the magnitude plot, the coil 330 voltage spikes to a large value when operating frequency equals the resonant frequency. For the particular circuit of FIG. 3, the quasi-resonant frequency band is approximately f/f0=0.8 to f/f0=2.0, excluding the resonant frequency. In the quasi-resonant frequency band, the transmitter coil 330 voltage is a function of power supply frequency. Thus, in the quasi-resonant frequency band, the magnetic field intensity at transmitter coil 330, which is related to coil 330 voltage, is a function of transmitter power supply frequency also. A change in power supply frequency will therefore effect a change in magnetic field intensity and correspondingly may alter the maximum rate of power transfer.

It is further seen from the magnitude plot of FIG. 4 that, at power supply frequencies above the quasi-resonant frequency band, the coil voltage is substantially equal to the power supply voltage and the circuit is operating in a non-resonant mode. In non-resonant mode the circuit is substantially inductive, capacitor 320 appearing as a short circuit to the high frequencies. For a system designed to operate in non-resonant mode, capacitor 320 may be eliminated.

FIG. 5 illustrates the exemplary transmitter of FIG. 3 coupled to an exemplary receiver. The transmitter includes power supply 310, capacitor 320, and coil 330. The receiver includes power transfer coil 510 with inductance L2, capacitor 520 with capacitance CM, capacitor 530 with capacitance C2, and a load shown as resistor 540 with resistance R_load. The voltage across the load is noted as V_out. For the particular circuit of FIG. 5, the receiver resonant frequency is approximately f=1.9 f0.

FIG. 6 illustrates the coupled frequency response of the transmitter/receiver of FIG. 5 by a plot of the transfer function of the circuit on a semi-log graph. The transfer function plotted is the output voltage V_out as a function of the power supply 310 voltage. The upper plot is the magnitude of the transfer function in decibels (dB) and the lower plot is the phase of the transfer function in degrees. The horizontal axis is normalized frequency f/f0, displayed logarithmically.

In the magnitude plot, receiver load voltage V_out spikes to a large value when the transmitter power supply 310 frequency is equal to the transmitter resonant frequency, with a smaller spike when the transmitter power supply 310 frequency is equal to the receiver resonant frequency of f=1.9 f0. Also in the magnitude plot, receiver load voltage V_out is a function of transmitter power supply 310 frequency over the frequency range shown.

From FIG. 6 it can be seen that a receiver may still receive power from the transmitter even though the transmitter and receiver resonant frequencies are different. It can also be seen from FIG. 6 that the transmitter may operate away from resonance and away from the resonant frequency of the receiver yet still deliver power to the receiver load. Therefore, power transfer occurs over a wide frequency band.

There are multiple benefits from operating in non-resonant or quasi-resonant mode. For example, operation in non- or quasi-resonant mode may reduce power supply implementation costs as follows. When operating at resonant frequency, the voltage on the transmitter coil is amplified and may be significantly larger than the input voltage to the resonant circuit, and therefore the input voltage must be limited to prevent the coil voltage from becoming excessively high. In non-resonant or quasi-resonant mode, coil voltage is lower or not much higher than the power supply voltage, therefore the power supply voltage does not need to be limited. For a grid connected power supply, for example, 110V/60 Hz, 220/60 Hz or 220V/50 Hz AC power is typically converted to high-voltage DC power (e.g., 100-400V), then stepped down to low-voltage DC power (e.g., 5V), then converted to low voltage AC power for input to the resonant transmitter. In contrast, it may be possible to eliminate the step-down converter for a non-resonant or quasi-resonant transmitter, thereby saving cost.

A transmitter power supply may include switches for converting DC power to AC power. For example, a transmitter may include one or more H-bridges. For zero-voltage switching, capacitors may be included electrically in parallel to the switches.

Another benefit of operation in non-resonant or quasi-resonant mode is cost savings from not implementing variable components, or from using lower-precision variable components than needed for resonant systems. Maximum power transfer may be achieved when operating at the resonance frequency and additionally by using a resonant circuit with a high Q-factor. Changing system conditions may require adjustments to a resonant circuit to maintain operation at a resonant frequency or to maintain a high Q-factor for the resonant circuit. Such adjustments are made, for example, using variable components, which tend to be expensive. In a non-resonant or quasi-resonant mode, the transmitter circuit does not need to be adjusted. For low cost systems it may be preferable to use a lower quality factor coil and operate in quasi-resonant or non-resonant mode. In addition to the lower coil cost, frequency tuning may not be necessary. However, lower Q-factor generally results in higher power loss, and system design must take this into account.

Another benefit of operation in non-resonant or quasi-resonant mode is the ability to perform power transfer from one transmitter to multiple receivers substantially simultaneously. In a resonant wireless power transfer system, when both transmitter and receiver operate at resonant frequency, if another receiver is also coupled to the transmitter there will be a degradation of the voltage on the transmitter coil and a corresponding degradation of the magnetic field due to a reduced quality factor of the system. The field may degrade to the point where the power transferred to a receiver is below the minimum power required by the receiver. This phenomenon is a major limitation to the use of a resonant transmitter for the case of multiple receivers. In contrast, in non- or quasi-resonant mode, the transmitter is largely unaffected by additional receivers being coupled to the transmitter because the transmitter circuit does not rely on amplification provided by the high quality factor of a resonant circuit. Further, the non- or quasi-resonant transmitter may adjust frequency or voltage as necessary for various operating conditions for single or multiple receivers.

Figure 7:
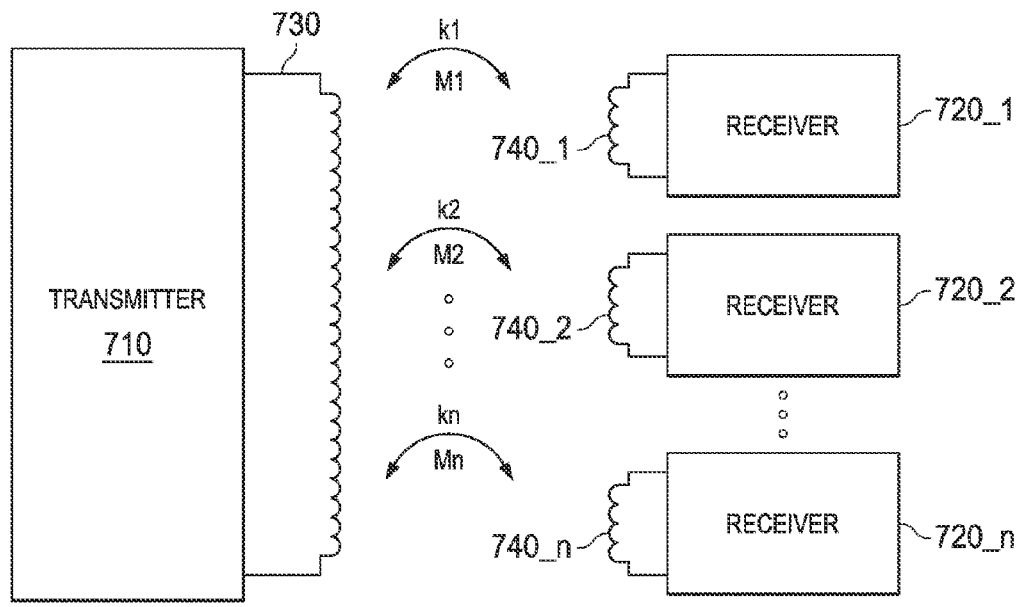
FIG. 7 illustrates an exemplary wireless power transfer system with multiple receivers.

FIG. 7 illustrates an exemplary wireless power transfer system with one transmitter 610 and a number 'n' of receivers 620, shown as receivers 620_1 through 620_n. Transmitter 610 includes power transfer coil 630. Each receiver 620 includes a power transfer coil 640, shown as coils 640_1, 640_2, and 640_n corresponding to receivers 620_1, 620_2, and 620_n, respectively. The receiver coils 640 are coupled to transmitter coil 630 with a corresponding coupling coefficient and mutual inductance. For example, receiver coil 640_1 is coupled to transmitter coil 630 with coupling coefficient k1 and mutual inductance M1.

A power transfer system may be designed such that transmitter 610 and receivers 620 have different resonant frequencies. Moreover, receivers 620 may be designed independently from the overall system and thus have resonant frequencies different than transmitter 610. Thus, transmitter 610 may be designed to be receiver agnostic and to provide power across a specified frequency band, such that any receiver 620 in which the resonant frequency is within the specified frequency band may be charged or powered by transmitter 610.

For the case of a resonant system with receivers at different resonant frequencies the transmitter will need to tune to the different receiver resonant frequencies to obtain the maximum power transfer. The non- or quasi-resonant system does not require a tunable transmitter, hence system cost can be reduced.

As an example, a transmitter may be designed to operate at a fixed quasi-resonant frequency. Multiple receivers may be designed to receive power from the transmitter. One of the multiple receivers may be designed with low-power components to meet cost savings, receiver size, or other constraints. To keep from electrically overstressing the low-power components, it may be desirable for the receiver coil voltage to be kept relatively low. The low-power receiver may be designed with a resonant frequency within the transmitter quasi-resonant frequency band, such that the receiver voltage remains below the design limits for that receiver. Another receiver in the system may be designed for quick-charge, and thus the quick-charge receiver resonant frequency is designed to be substantially equal to the transmitter resonant frequency. The quick-charge receiver will then receive maximum power transfer.

A transmitter may be designed to communicate with receivers and adapt operation to optimize power transfer to multiple receivers based on the communication.

Figure 8:
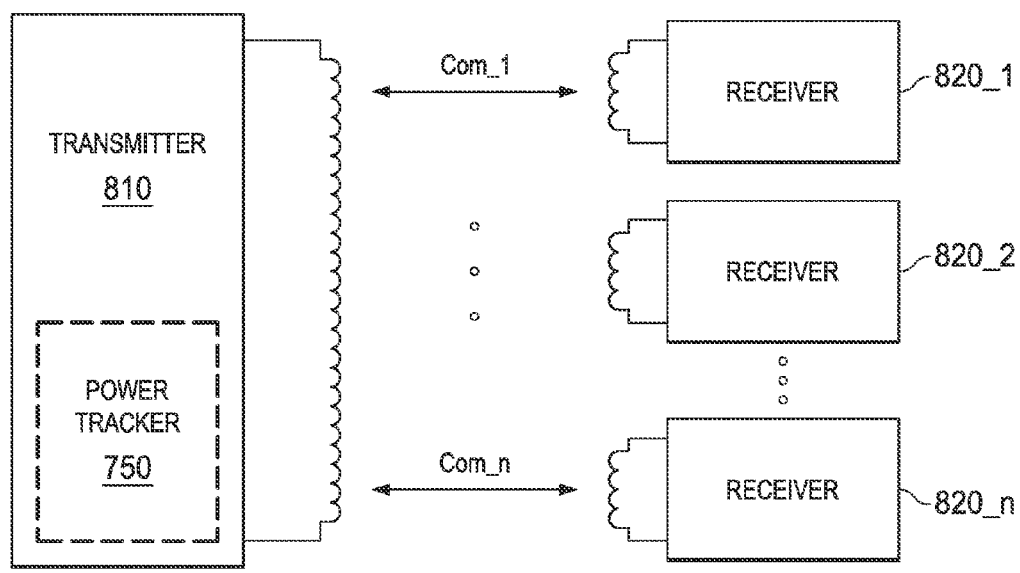
FIG. 8 illustrates an exemplary wireless power transfer system with multiple receivers, and including communications links and a power tracker.

FIG. 8 illustrates an exemplary wireless power transfer system similar to the system of FIG. 7, with one transmitter 810 and a number 'n' of receivers 820, shown as receivers 820_1 through 820_n. The system of FIG. 8 further includes a communication link Com_1 between receiver 820_1 and transmitter 810, a communication link Com_n between receiver 820_n and transmitter 810. As shown in FIG. 8, receiver 820_2 does not have a communication link to transmitter 810, illustrating that communication links are optional.

Communication links may be wired or wireless links, and may use standard or proprietary protocols for exchanging information. Although illustrated as bidirectional, a communication link may be unidirectional. A communication link may be used, for example, to identify the type of receiver 820, its resonant frequency, or its maximum power limit. Transmitter 810 may determine its optimal operating frequency that provides, as one example, the fastest power transfer for the combination of proximal receivers 820 while keeping power transfer under the maximum limits for each receiver 820.

A transmitter may change from one operating mode to another to adapt to changing system conditions. For example, if the transmitter is receiving power from a battery, and the battery voltage is decreasing, the transmitter may switch into resonant mode from quasi-resonant or non-resonant mode to provide amplification of the input voltage in the resonant circuit. For another example, if the transmitter is receiving power from a low-voltage battery and then is switched over to a power grid source, the transmitter may switch from a resonant mode to a non-resonant or quasi-resonant mode. In these latter two examples, switching to and from resonant mode may be accomplished simply by adjusting the transmitter power supply frequency.

CONCLUSION

A transmitter used for wireless power transfer may be operated at a resonant frequency, a quasi-resonant frequency, or a non-resonant frequency to accommodate the needs of the receiver or receivers coupled to the transmitter.

Effective power transfer in a wireless power transfer system may be performed over a range of frequencies without tuning the transmitter or receiver resonant circuits, by operating in a non-resonant or quasi-resonant mode.

Operation in a non- or quasi-resonant mode allows for adjustment of power supply frequency to effect a change in coil voltage and thereby a change in magnetic field intensity.

In non- or quasi-resonant mode, transmitter frequency may be adjusted to adjust the amount of power transferred to a given receiver based on the power needs of the receiver. Also in non- or quasi-resonant mode, the transmitter frequency may be adjusted to increase power transferred when multiple receivers are present.

Further, a system may be designed in which the resonant frequency of a receiver is purposely different from the resonant frequency of the transmitter. The greater the difference in frequency, the less power delivered, and the system may therefore be designed to accommodate receivers with different power needs.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A wireless power transfer system suitable for wirelessly supplying power from an alternating current (AC) power supply to multiple power receivers, comprising:
   a power transmitter including a resonator circuit with a transmitter coil, and characterized by a resonance frequency, a quasi-resonant frequency band on either side of the resonance frequency, and upper and lower non-resonant frequency bands above and below the quasi-resonant frequency band, where the non-resonant frequency band is characterized by a coil voltage substantially equal to the Power supply voltage;
   the transmitter circuit configured to transmit power from the power supply through the transmitter coil at a transmitter frequency within the non-resonant frequency band; and
   multiple power receivers, each including a receiver circuit with a receiver coil, and configured to receive power through the receiver coil transmitted by the transmitter at the transmitter frequency;
   wherein power is transferred to the multiple receivers substantially simultaneously.

2. The wireless power transfer system of claim 1, wherein the receiver includes a resonant receiver circuit, including the receiver coil, with a resonance frequency that corresponds to the transmitter frequency.

3. The wireless power transfer system of claim 1, wherein the AC power supply is configured to receive an input high voltage AC power, and includes an AC-DC converter stage for converting the high voltage AC power to high voltage direct current (DC) power, and a DC-AC converter stage for converting the DC power to AC power for input to the transmitter coil.

4. The wireless power transfer system of claim 1, further comprising a communications link between the transmitter and receiver.

5. The wireless power transfer system of claim 1, the receiver included in an electronic device, the receiver configured to provide transferred power to circuits in the electronic device, thereby functioning as the power source for the circuits during normal operation.

6. The wireless power transfer system of claim 1, the receiver included in an electronic device, the receiver configured to provide transferred power to a battery in the electronic device, thereby charging the battery.

7. The receiver of claim 1, further comprising a communications link between the transmitter and receiver.

8. The receiver of claim 1, the receiver included in an electronic device, the receiver configured to provide transferred power to circuits in the electronic device, thereby functioning as the power source for the circuits during normal operation.

9. The receiver of claim 1, the receiver included in an electronic device, the receiver configured to provide transferred power to a battery in the electronic device, thereby charging the battery.

10. A wireless power transfer transmitter suitable for use in a wireless power transfer system that wirelessly supplies power from an alternating current Power supply to multiple power receivers, the transmitter comprising:
    a power transmitter circuit; and
    a resonator circuit with a transmitter coil, and characterized by a resonance frequency, a quasi-resonant frequency band on either side of the resonance frequency, and upper and lower non-resonant frequency bands above and below the quasi-resonant frequency band, where the non-resonant frequency band is characterized by a coil voltage substantially equal to the power supply voltage;
    the transmitter circuit and the resonator circuit are configured to transmit Power from the power supply through the transmitter coil at a transmitter frequency within the non-resonant frequency band; and
    each of the multiple power receivers includes a receiver circuit with a receiver coil, and is configured to receive power through the receiver coil transmitted by the transmitter at the transmitter frequency;
    wherein power is transferred to the multiple receivers substantially simultaneously.

11. The wireless power transfer transmitter of claim 10, wherein at least one of the multiple receivers includes a resonant circuit, including the receiver coil, with a resonance frequency that corresponds to the transmitter frequency.

12. The wireless power transfer transmitter of claim 11, further comprising a communication link between the transmitter and the multiple receivers.

13. The wireless power transfer transmitter of claim 11, wherein at least one of the receivers is incorporated with an electronic device, the receiver configured to provide transferred power to a battery in the electronic device, thereby charging the battery.

14. A wireless power transfer receiver suitable for use in a wireless power transfer system that wirelessly supplies power from an alternating current (AC) power supply to multiple power receivers, the system including a power transmitter that includes a transmitter coil, and is configured to transmit power from the power supply through the transmitter coil at a transmitter frequency, the power receiver comprising:
- a receiver circuit; and
- a receiver coil;
- the receiver circuit configured to receive power through the receiver coil transmitted by the transmitter at the transmitter frequency;
- wherein the power transmitter comprises a resonant transmitter circuit including the transmitter coil, and wherein the resonant transmitter circuit is characterized by a resonance frequency, a quasi-resonant frequency band on either side of the resonance frequency, and upper and lower non-resonant frequency bands above and below the quasi-resonant frequency band, and where the non-resonant frequency band is characterized by a coil voltage substantially equal to the power supply voltage, and
- the transmitter frequency is within the non-resonant frequency band; and
- wherein power is transferred to the receiver substantially simultaneously with power transfer to the other receivers.

15. The receiver of claim 14, wherein the receiver comprises a resonant receiver circuit, including the receiver coil, the resonant receiver circuit characterized by a resonance frequency that corresponds to the transmitter frequency.

* * * * *